United States Patent [19]
Steranko et al.

[11] 3,840,169
[45] Oct. 8, 1974

[54] AUTOMATIC BONDING APPARATUS WITH MULTIPLE BONDING HEADS

[75] Inventors: James Joseph Steranko, Weston; John Henry Holland, Framingham, both of Mass.

[73] Assignee: Inforex, Inc., Burlington, Mass. ; by said Holland

[22] Filed: Apr. 2, 1973

[21] Appl. No.: 353,465

Related U.S. Application Data

[63] Continuation of Ser. No. 110,170, Jan. 27, 1971, abandoned.

[52] U.S. Cl. ............... 228/4, 29/203 B, 29/628, 219/85, 228/46
[51] Int. Cl. ............................................. B23k 1/00
[58] Field of Search ................ 228/3, 4, 5, 46, 3.5; 29/203 D, 203 B, 576 S, 626, 628; 219/85

[56] References Cited
UNITED STATES PATENTS

| | | | |
|---|---|---|---|
| 2,637,096 | 5/1953 | Luhn | 29/33 |
| 3,083,595 | 4/1963 | Frank et al. | 228/5 |
| 3,185,927 | 5/1965 | Margulis et al. | 29/574 |
| 3,192,358 | 6/1965 | Lasch, Jr. et al. | 219/85 |
| 3,307,763 | 3/1967 | Rasimenoks et al. | 228/3 |
| 3,392,256 | 7/1968 | Bradham, Ill. | 29/203 |

Primary Examiner—Robert D. Baldwin
Assistant Examiner—Robert J. Craig
Attorney, Agent, or Firm—Woodcock, Washburn, Kurtz & Mackiewicz

[57] ABSTRACT

In apparatus for automatically wiring circuit boards in a point-to-point operation, a continuous supply of insulated wire extends through an opening in the bonding tip. Circuit boards are positioned on a table, one circuit board beneath each of the heads. A digital controller positions the table so that the heads are aligned with solder pads on the circuit boards. A control system for each head responds to signals from the digital controller. Each control system automatically operates the heads to lower the head into contact with a solder pad, to selectively apply heat to the pad to reflow solder the portion of the wire in contact with the pad, and to raise the head to its normal position. The control system also operates electrical continuity checks to determine if each bond has been properly made and to continuously monitor for stripped insulation on the wire which might cause short circuits. After each bond is made, the wire is mechanically stressed to insure that the bond has the required mechanical strength.

9 Claims, 72 Drawing Figures

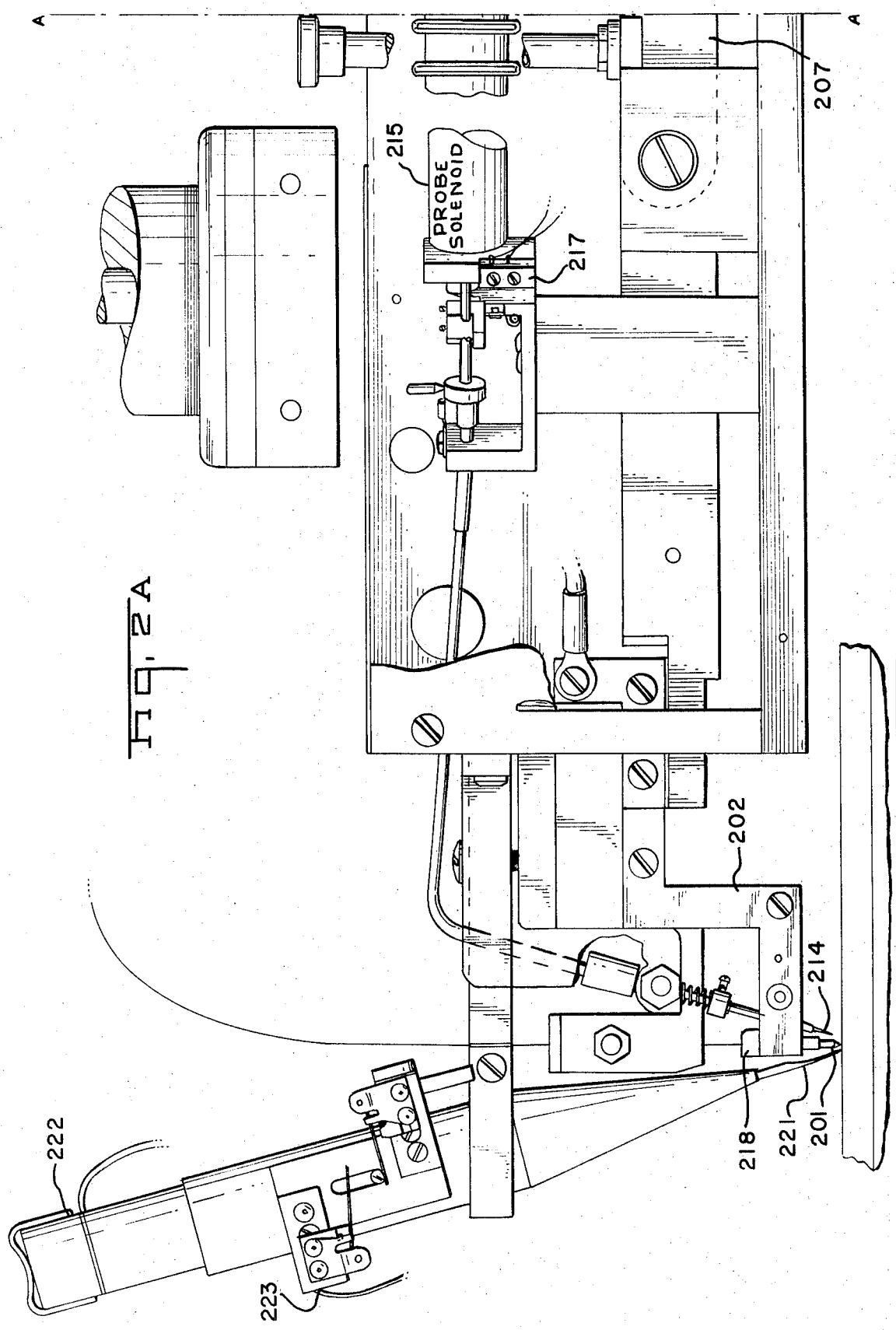

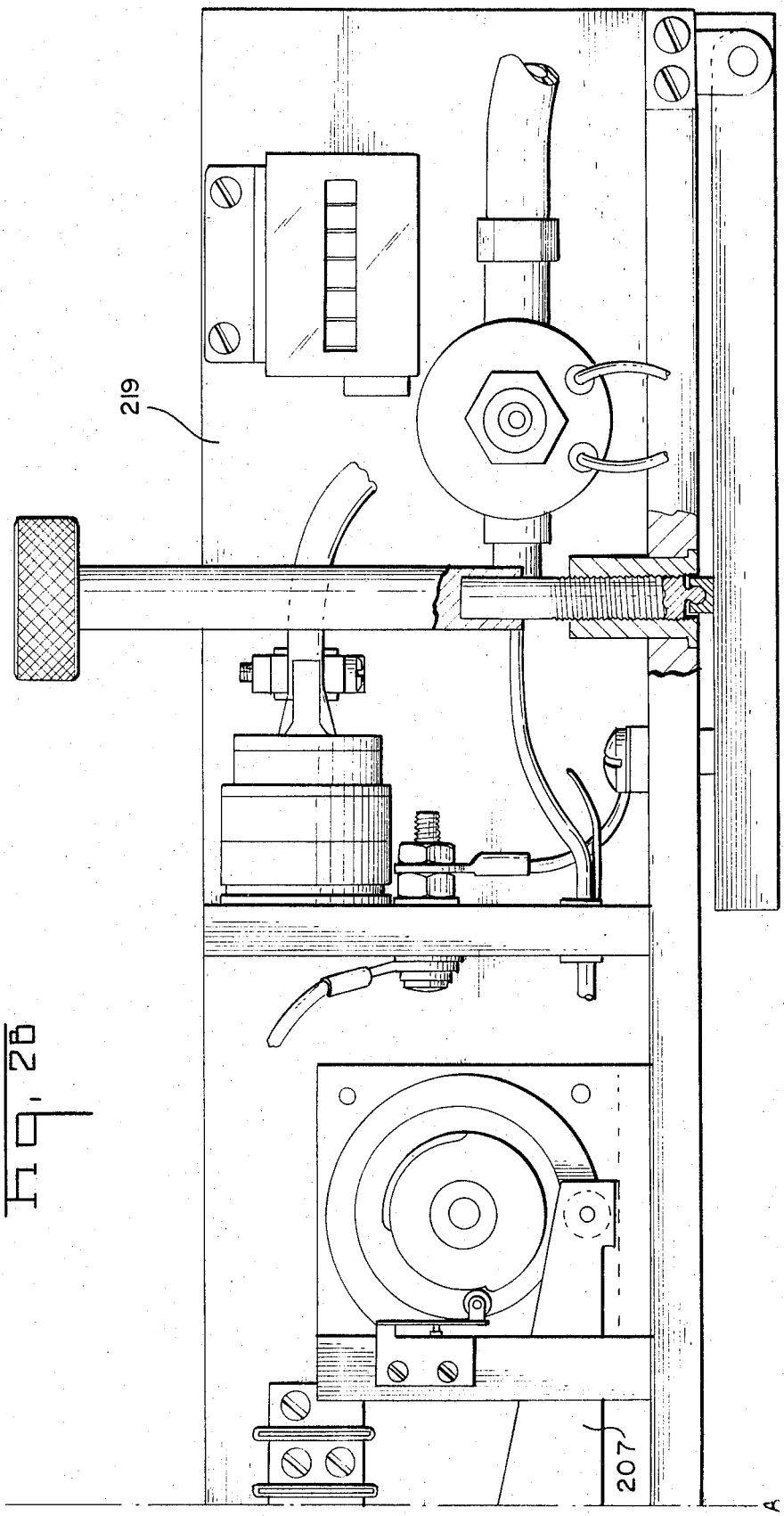

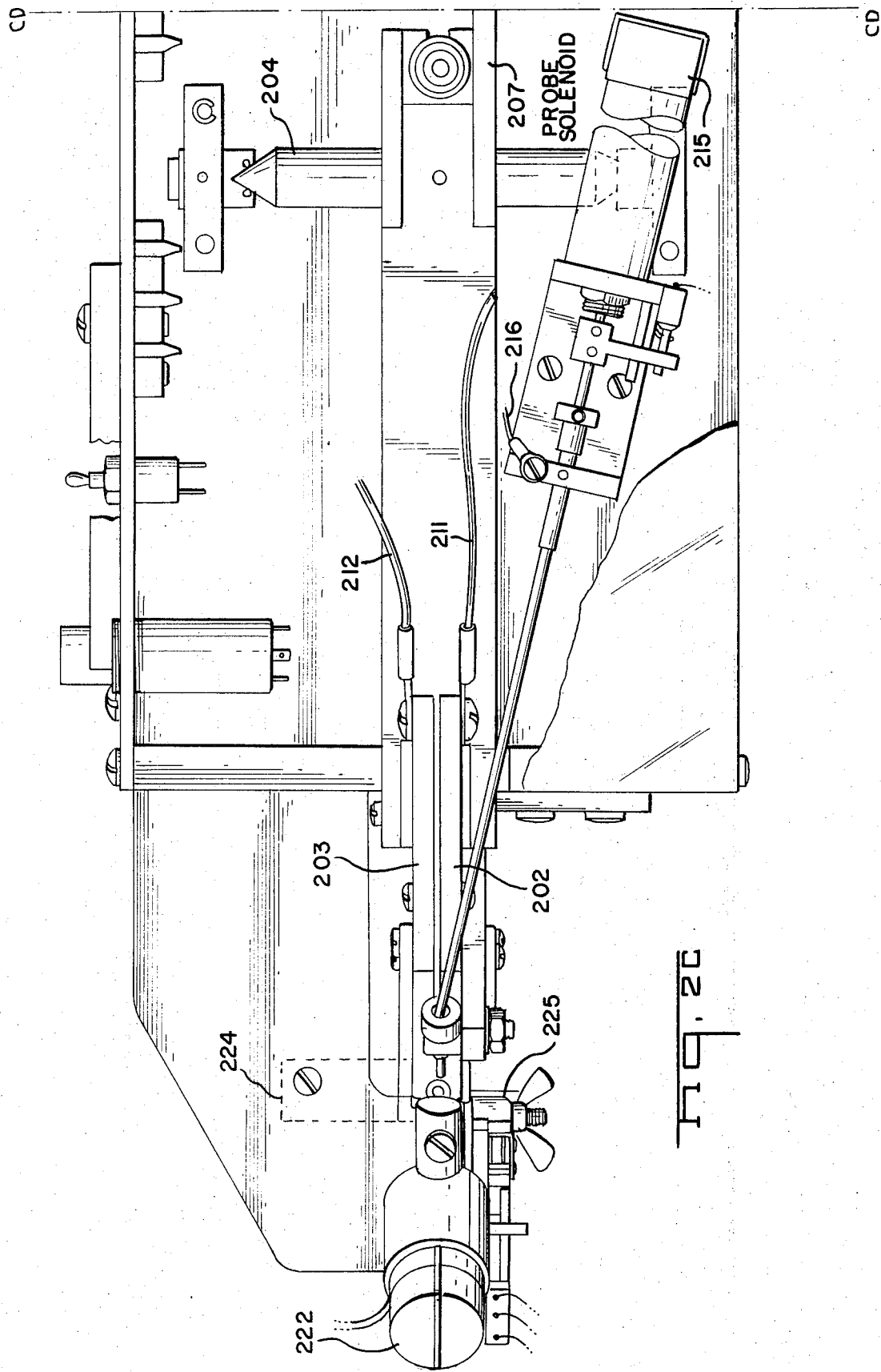

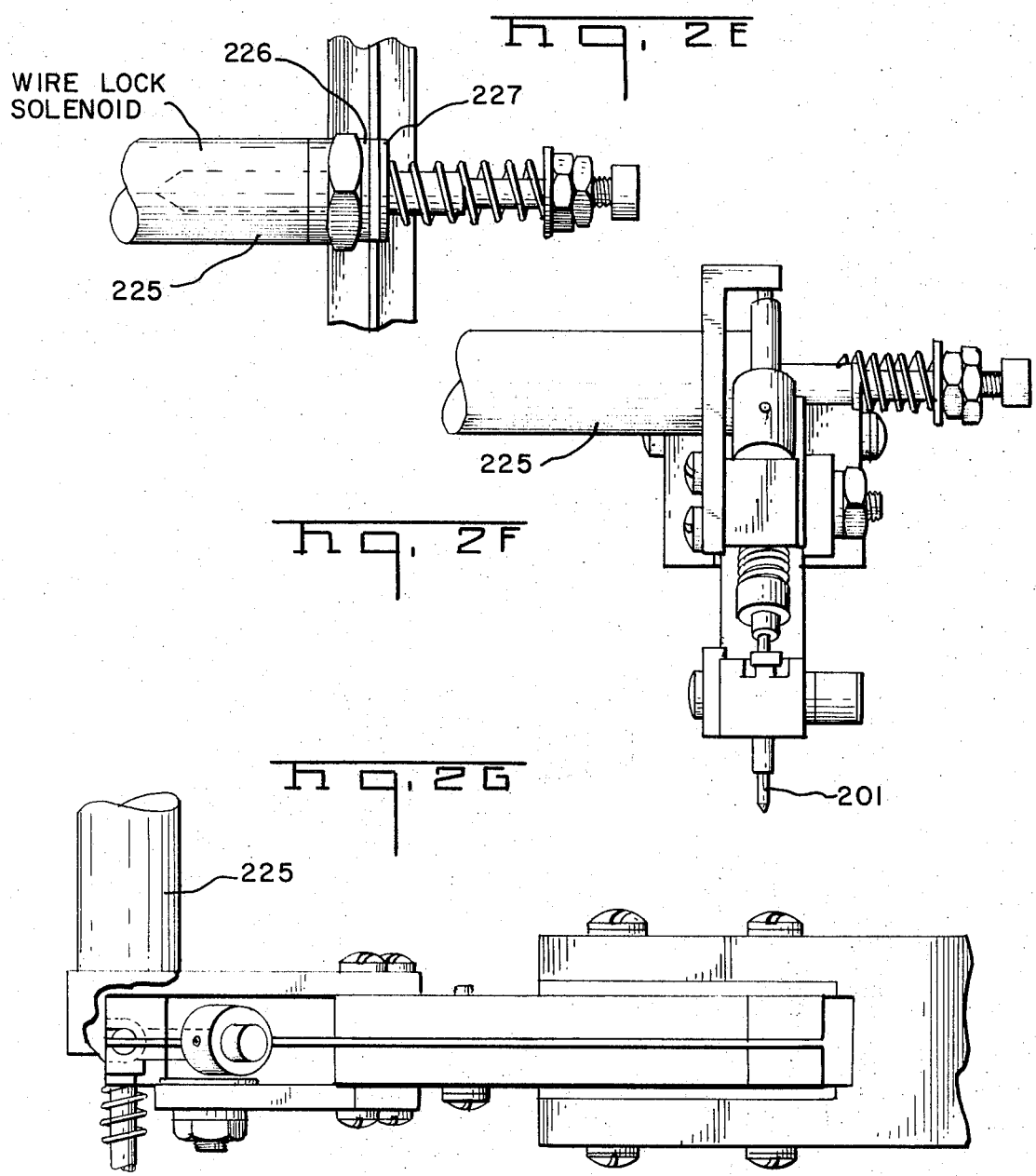

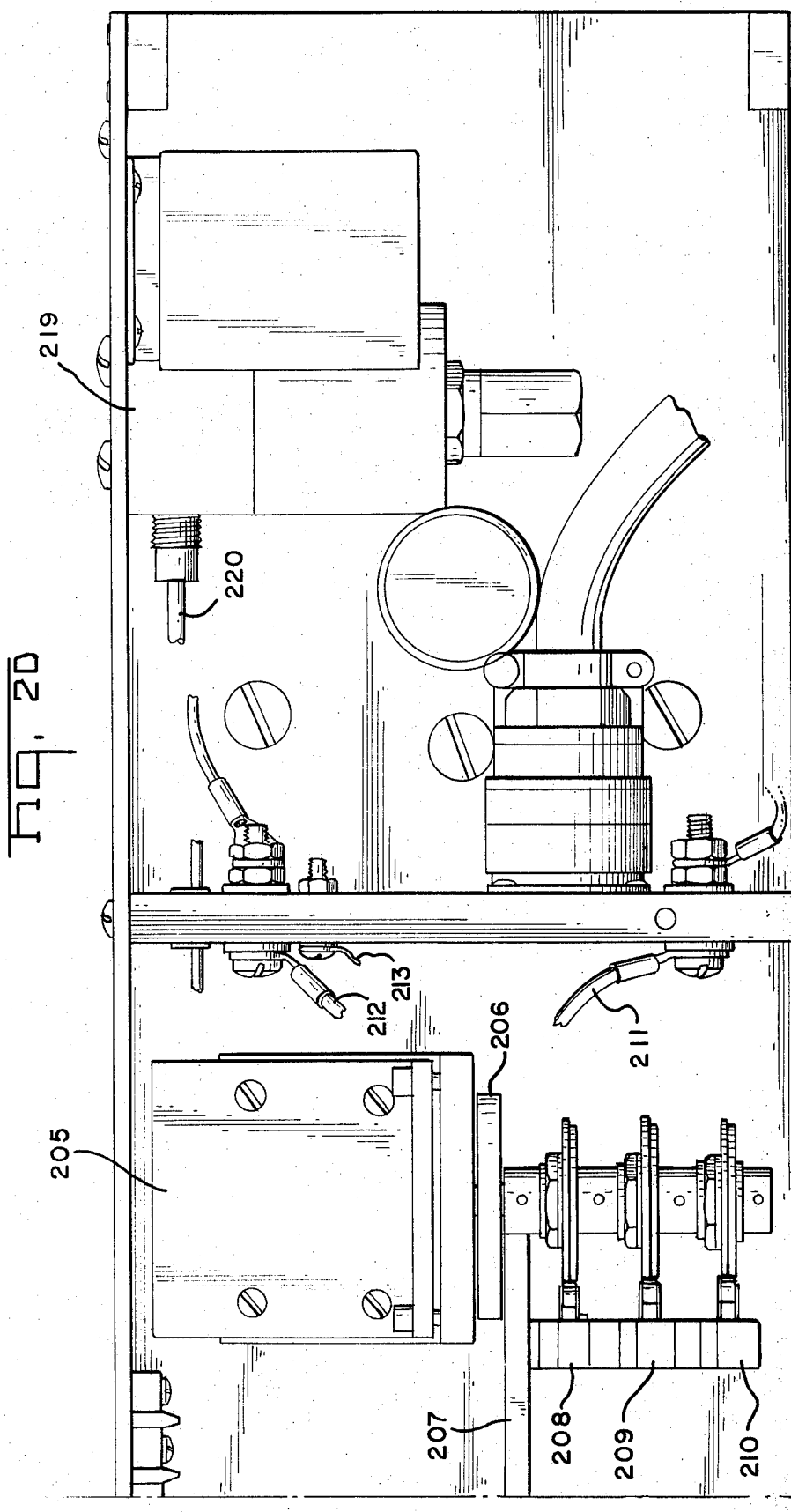

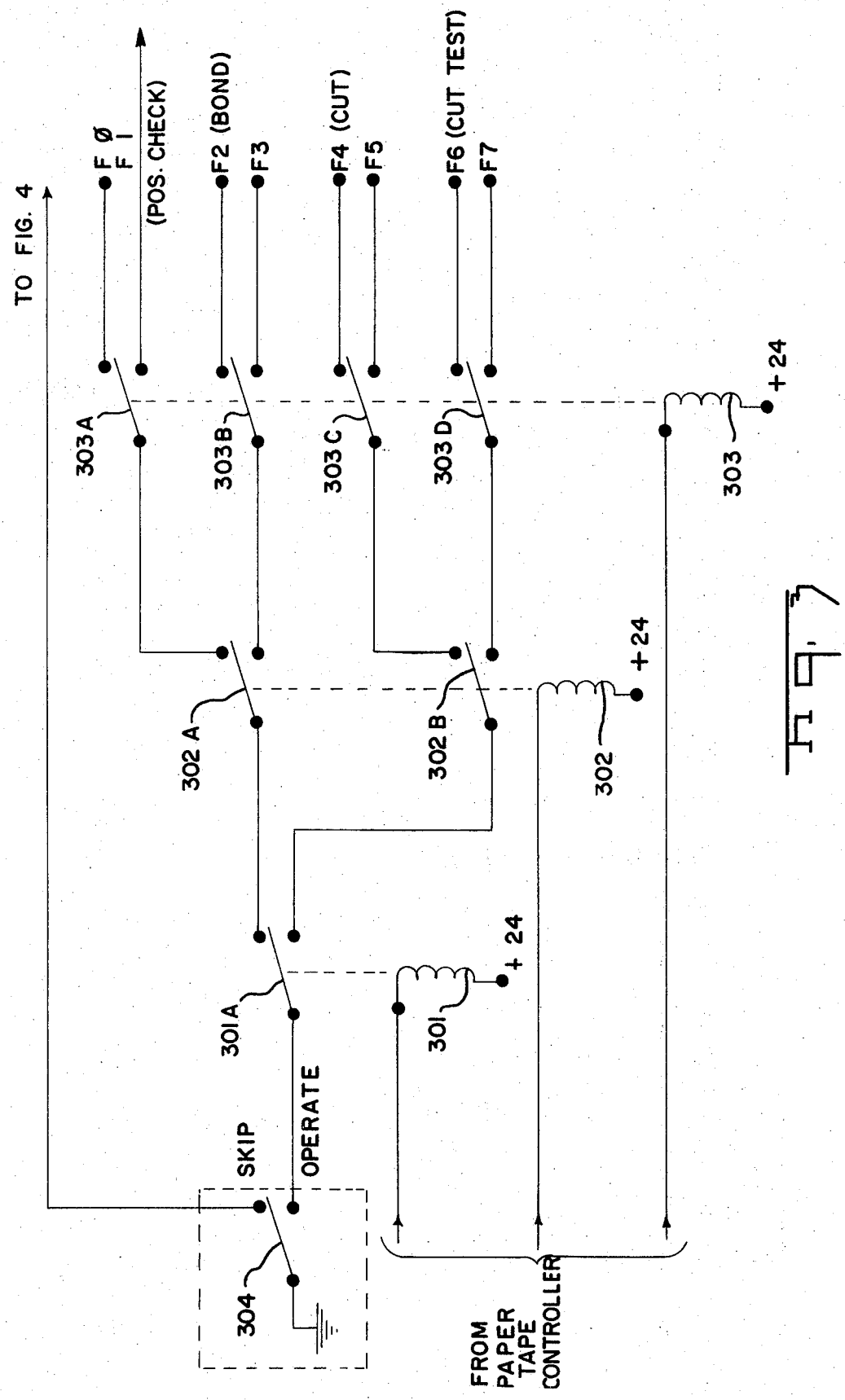

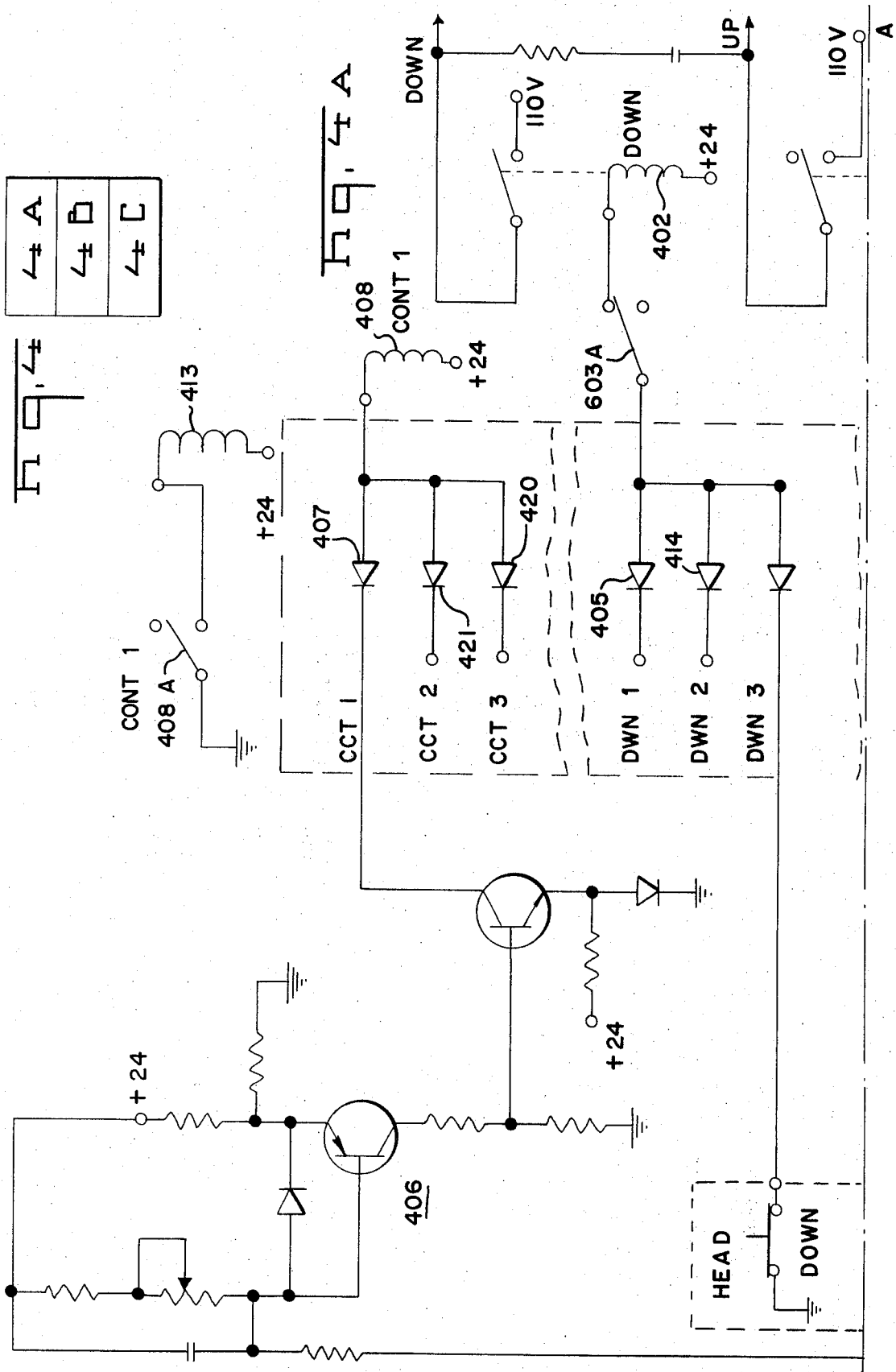

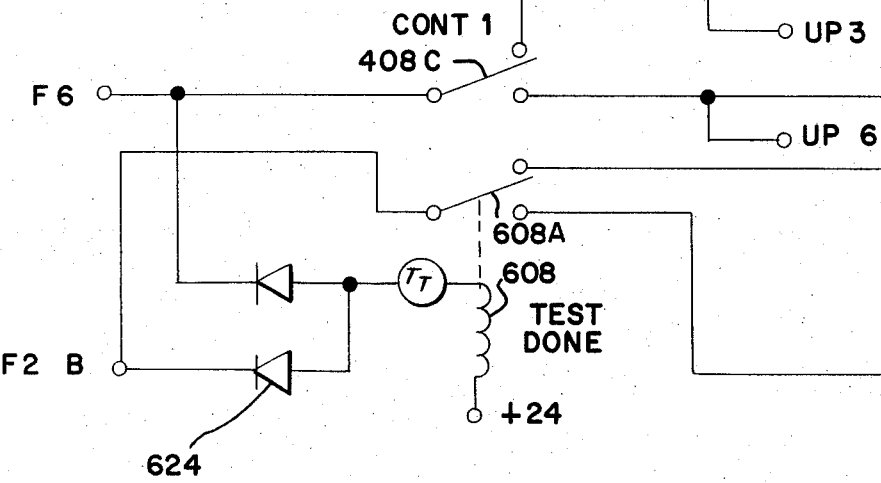
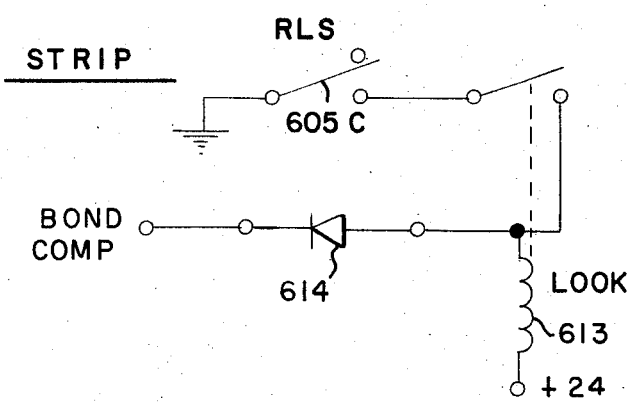
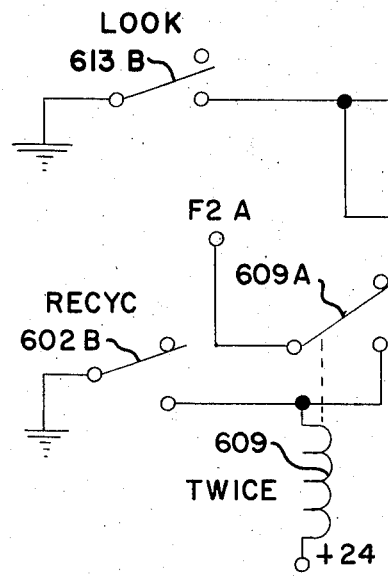
Fig. 6A  CONTINUITY TESTS
STRIP

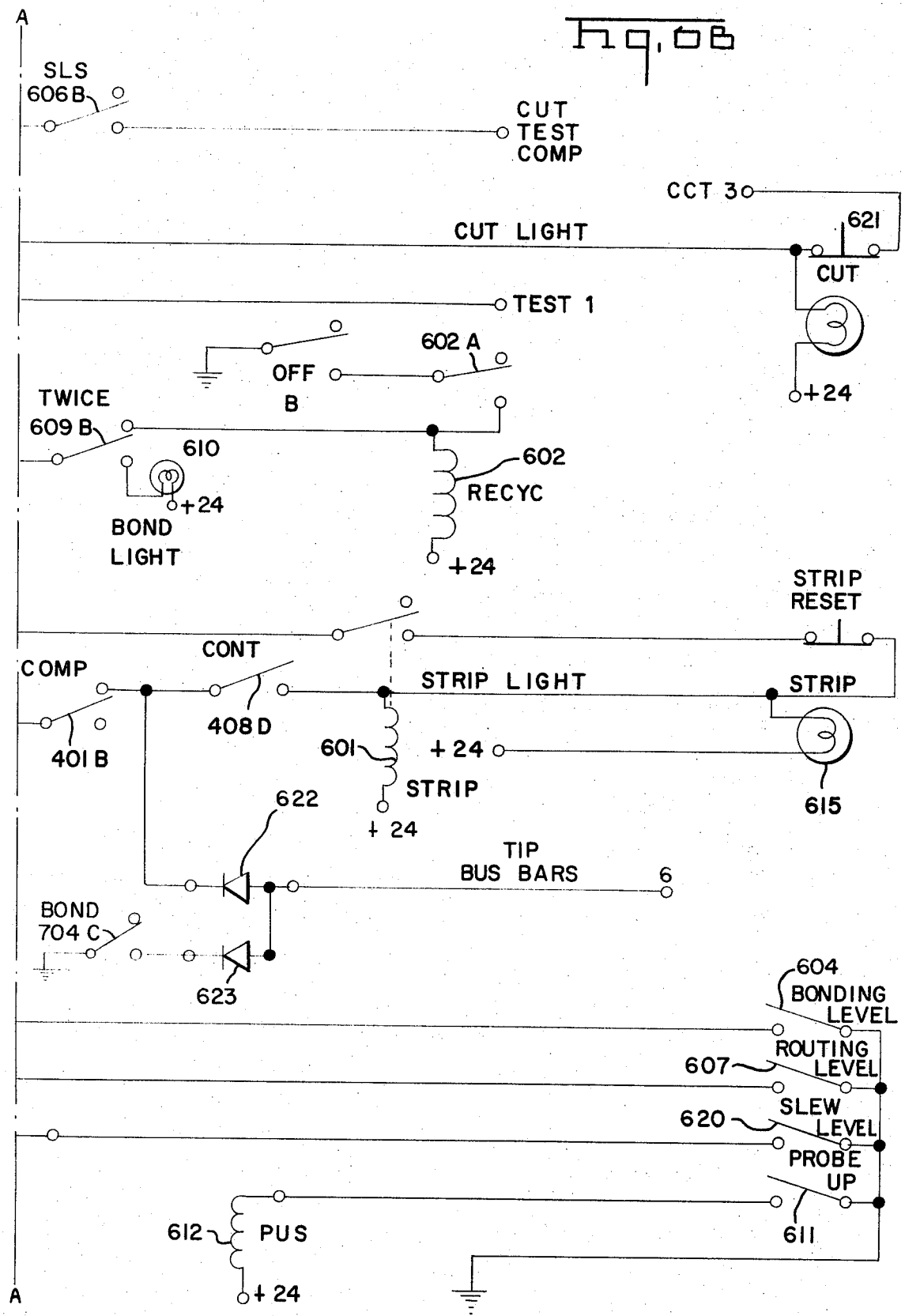

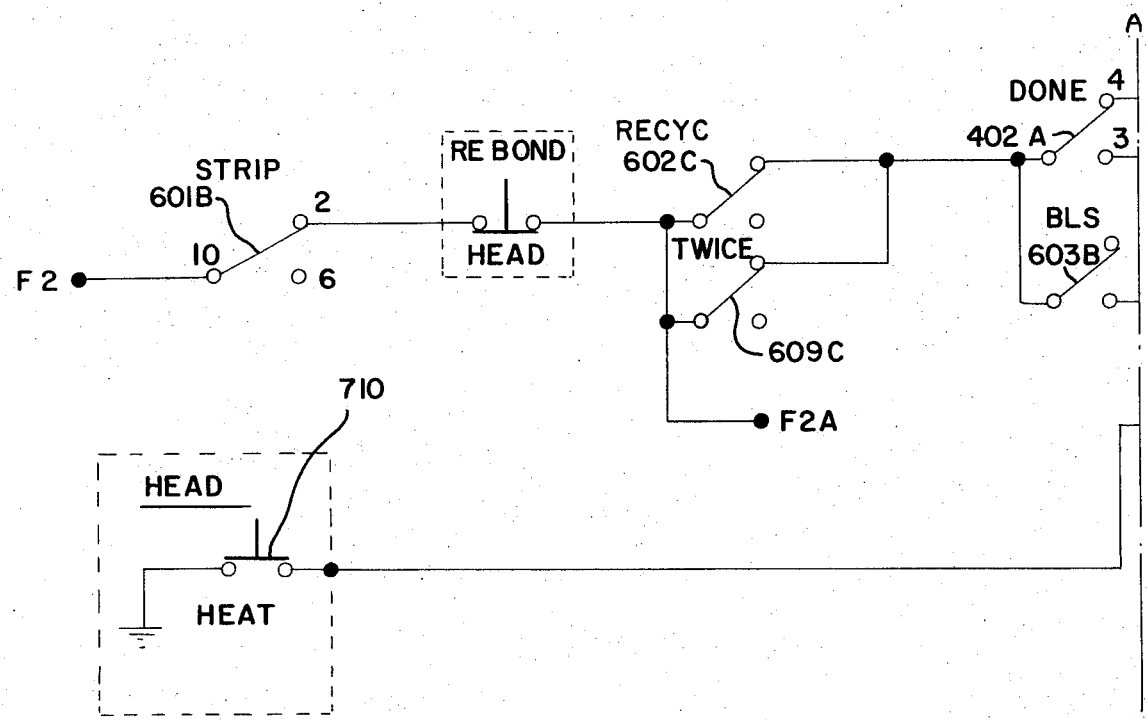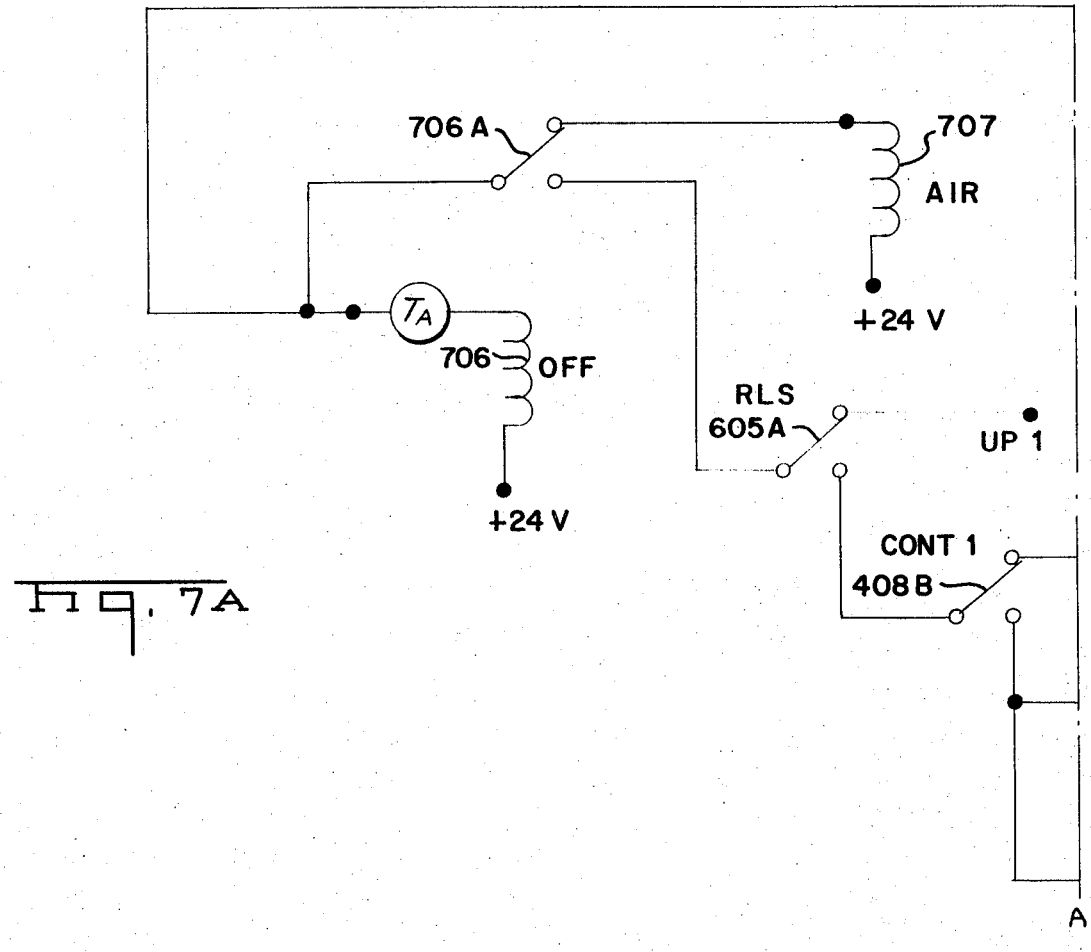
Fig. 7A

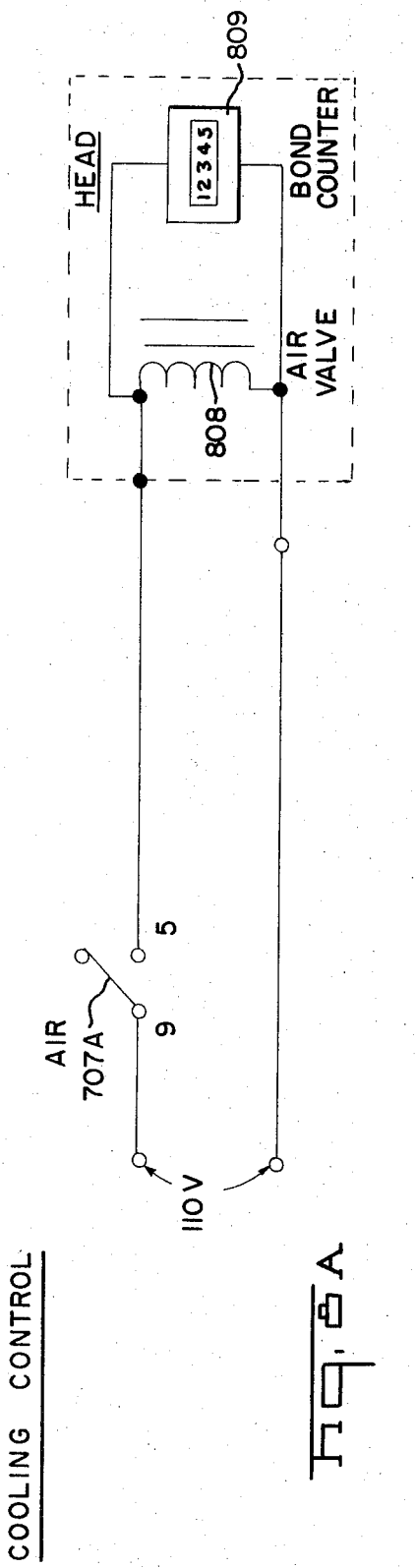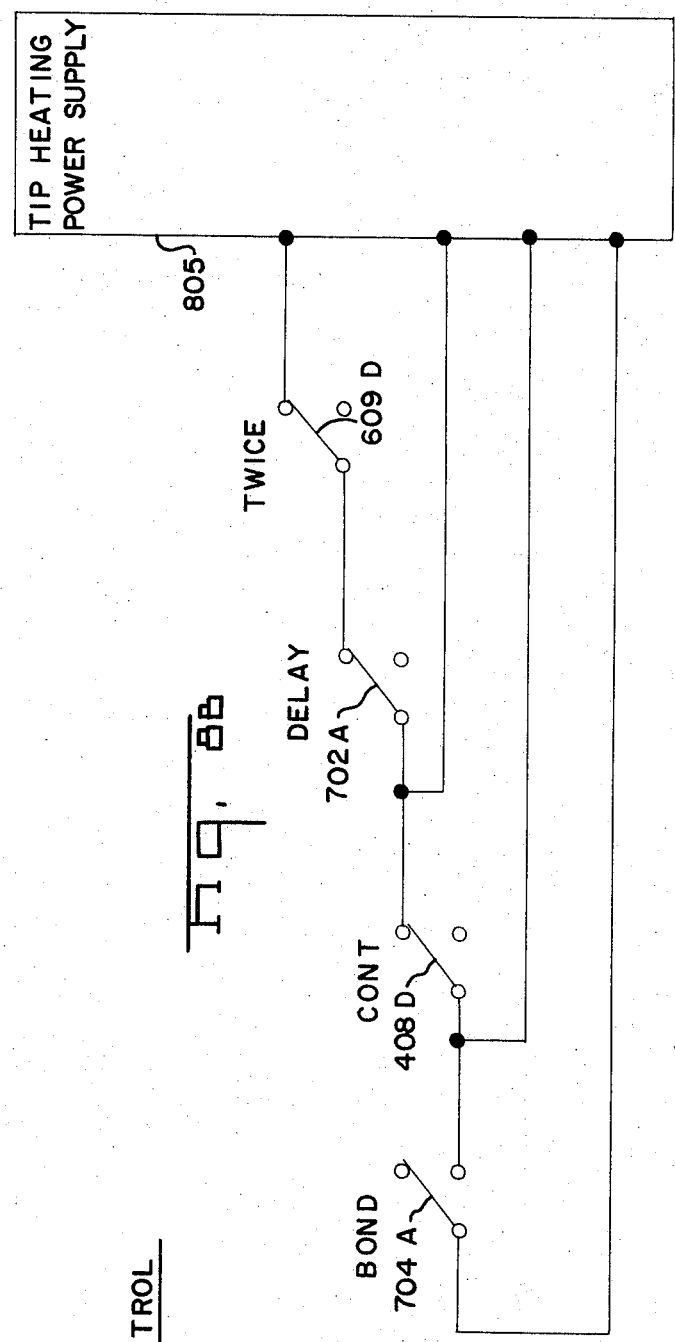
Fig. 8A
COOLING CONTROL
Fig. 8B
BONDING HEAT CONTROL

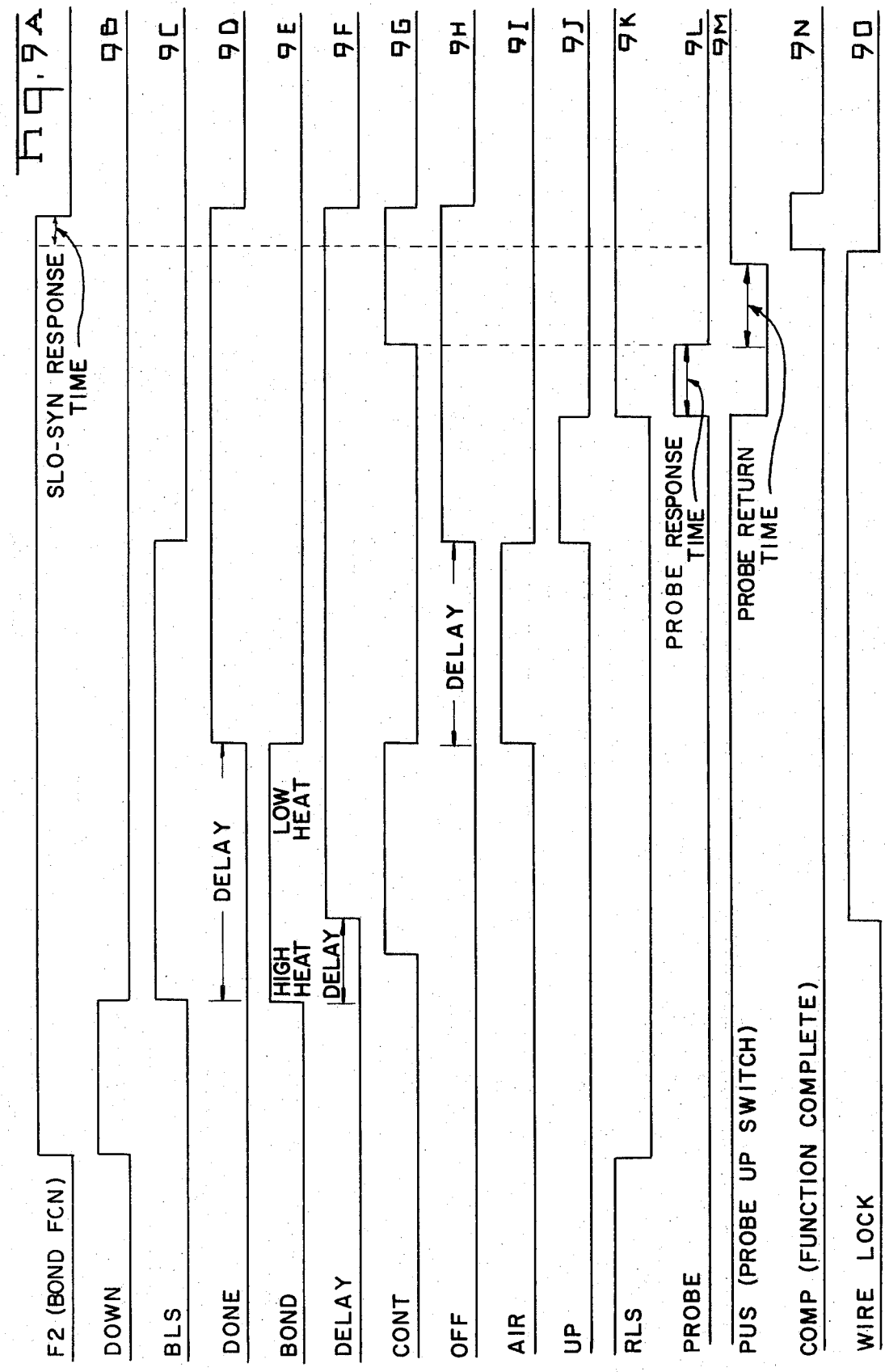

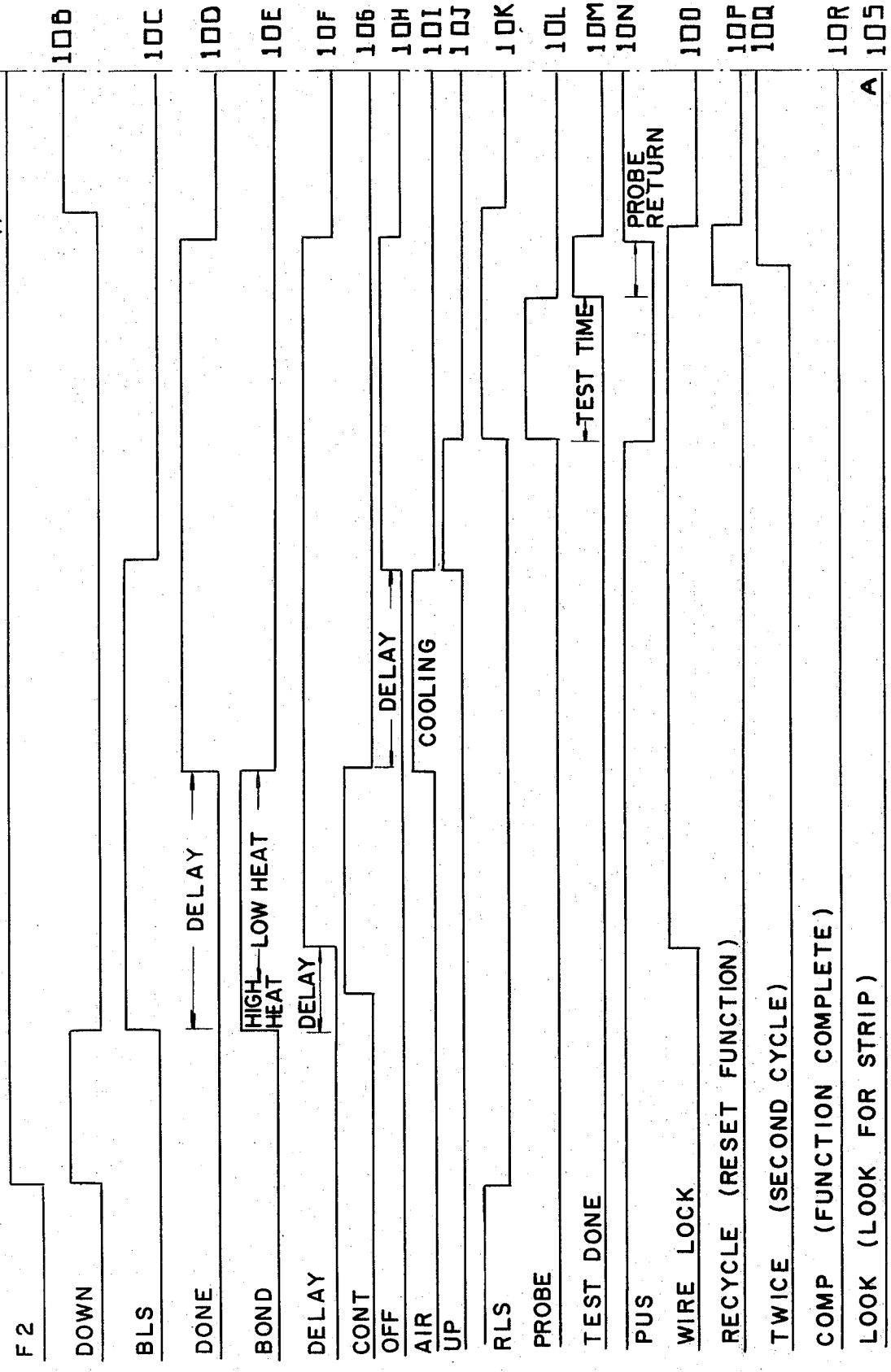

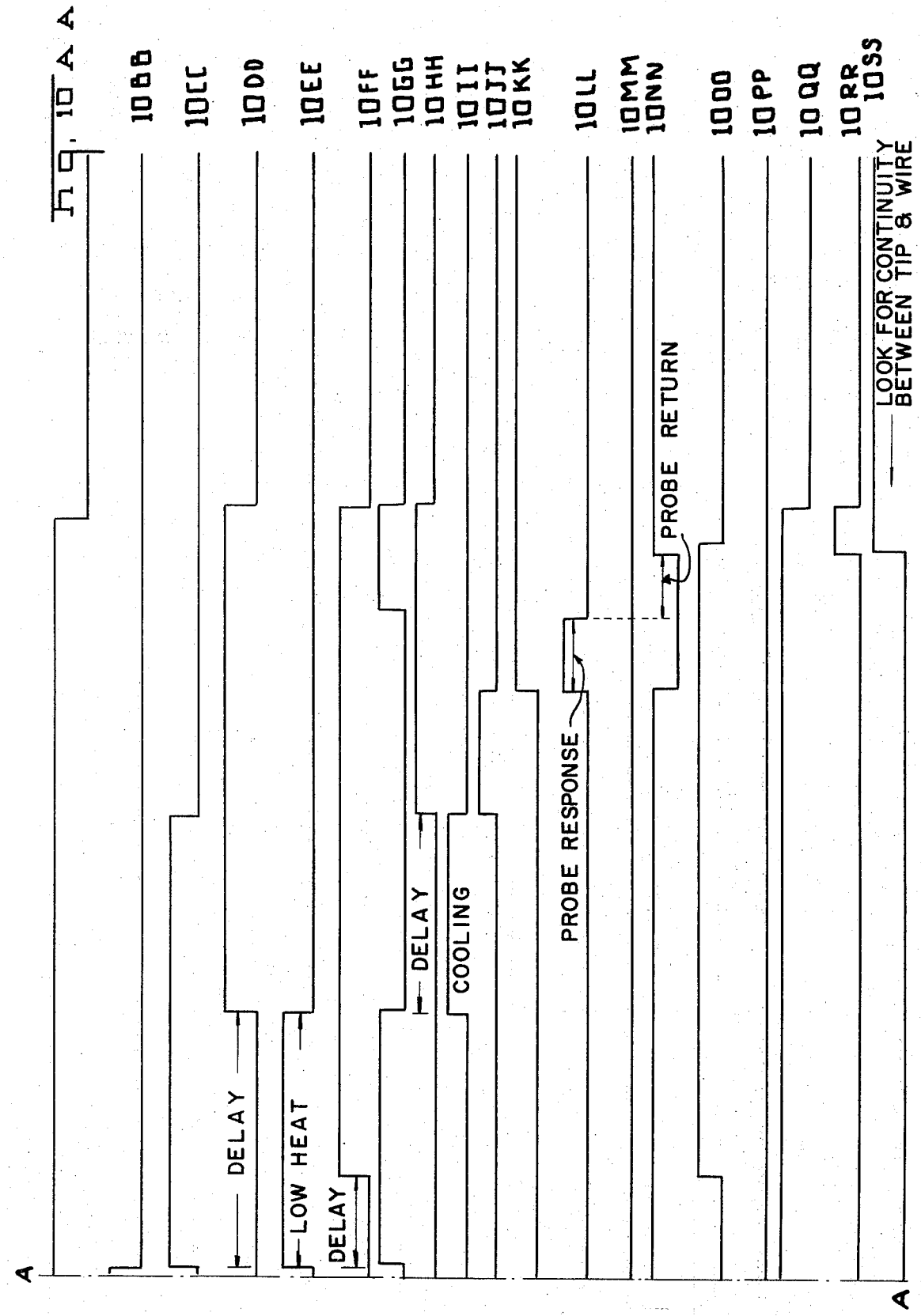

AUTOMATIC BONDING APPARATUS WITH MULTIPLE BONDING HEADS

This is a continuation of application Ser. No. 110,170, filed Jan. 27, 1971, now abandoned.

BACKGROUND OF THE INVENTION

This invention relates to automatic wiring apparatus and more particularly to a multiple head machine which is operated under control of a digital controller.

The fabrication of electrical circuits on circuit boards includes printed circuit techniques and point-to-point wiring processes. The complexity of the circuit often makes single, double, and even multiple layer printed circuit boards unsuitable for use.

Point-to-point automatic wiring processes have been used. For example, what is commonly referred to as a wire wrap machine is available from the Gardner-Denver Company. Another point-to-point wiring process is described in the Vickery, Jr. U.S. Pat. No. 3,186,077. In these processes wires are wound or wrapped, on terminal pins. The machines operate automatically under the control of a digital controller.

Another point-to-point technique involves reflow soldering a continuous supply of wire to selected pads on the printed circuit boards. In applications Ser. No. 812,022, filed Apr. 1, 1969, James J. Steranko U.S. Pat. No. 3,673,681, issued July 4, 1972 and Ser. No. 833,084, filed June 13, 1969, James J. Steranko and Arthur J. Guidi, Jr., U.S. Pat. No. 3,608,190, issued Sept. 28, 1971 there is described a wiring process in which solder bonds are made through insulated wire. The insulated wire extends through an opening in a solder head. The head is lowered into contact with a solder pad and heated. The heat sublimates the insulation and reflow solders the wire to the pad. The present invention is an improvement upon the apparatus and process described in those pending applications.

In such wiring systems it is desirable to wire more than one circuit board at a time. In the past, multiple head wiring machines have not been completely successful because it is quite difficult to make a machine which makes a good bond every time. Where multiple head machines are used, the occurrence of only one misbonding operation causes the whole machine to stop while this error is corrected.

SUMMARY OF THE INVENTION

In accordance with an important aspect of the present invention, multiple head wiring apparatus automatically operates under control of a digital controller.

In accordance with another important aspect of this invention, after each bond is made, it is electrically and mechanically tested to determine if the bond is properly made. A probe is lowered into contact with the bond to check for electrical continuity between the wire and the bond. If the bond is not properly made, the bonding head is operated another cycle of operation, which will generally correct the bad bond. This testing and recycling takes place under control of a control system which is provided for each head. It is performed independently of the operation of the digital controller. For this reason, the entire machine with multiple heads is not stopped each time a faulty bond is made. Rather, the machine runs almost continuously because faulty bonds are automatically repaired on the recycle.

In accordance with another important aspect of this invention, a wire gripper is provided to perform a nondestructive pull-test on each bond after completion of the bonding operation.

In accordance with another important aspect of this invention, an electrical continuity test is performed to detect stripped insulation on the wire. A test is made to determine possible continuity between the wire and the solder head through which the wire extends. The test is performed when there is relative movement between the table and the head, that is when wire is being routed from one solder pad to another. By detecting stripped or torn insulation, possible short circuits in the completed wiring pattern are avoided.

In accordance with another aspect of this invention, a flow of cooling air is automatically applied to the solder pad after each bond is made. This greatly reduces the cycle time of the machine.

In accordance with another important aspect of this invention a dual level power supply heats the solder tip to two different temperatures. A first, high heat, is applied to sublimate the insulation on the wire. The second, lower heat, reflow solders the wire to the pad.

The foregoing and other objects, features and advantages of the invention will be better understood from the following more detailed description.

DESCRIPTION OF THE DRAWINGS

FIGS. 2A and 2B show a side elevation view of the wiring head;

FIGS. 2C and 2D show a top plan view of the soldering head;

FIGS. 2E–2G show the details of the wire lock;

FIG. 3 shows the mode control switches;

FIGS. 4A, 4B and 4C show the continuity, motor drive and probe drive relays;

FIGS. 6A and 6B show the continuity and strip test circuitry;

FIGS. 7A and 7B show the bonding circuits;

FIG. 8A shows the cooling control circuit;

FIG. 8B shows the heat control circuit;

FIGS. 9A–9O show timing diagrams for an operation in which a good bond is obtained on the first cycle; and FIGS. 10A–10S and 10AA–10SS show timing diagrams for an operation in which a bad bond is made on the first cycle and a good bond is made on the recycle.

DESCRIPTION OF A PARTICULAR EMBODIMENT

Figure 1:
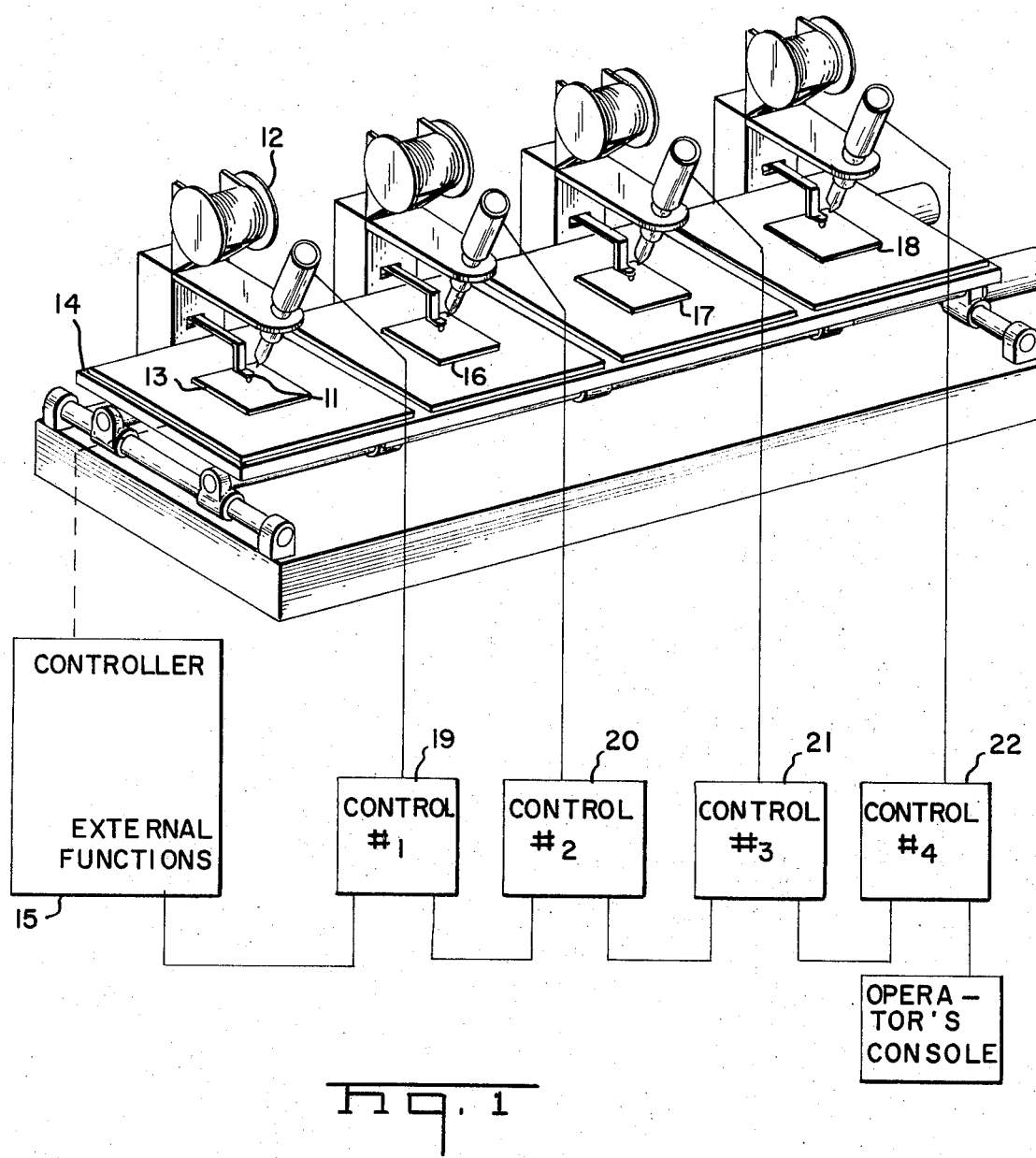
FIG. 1 is a pictorial view of the system.
Figure 4B:
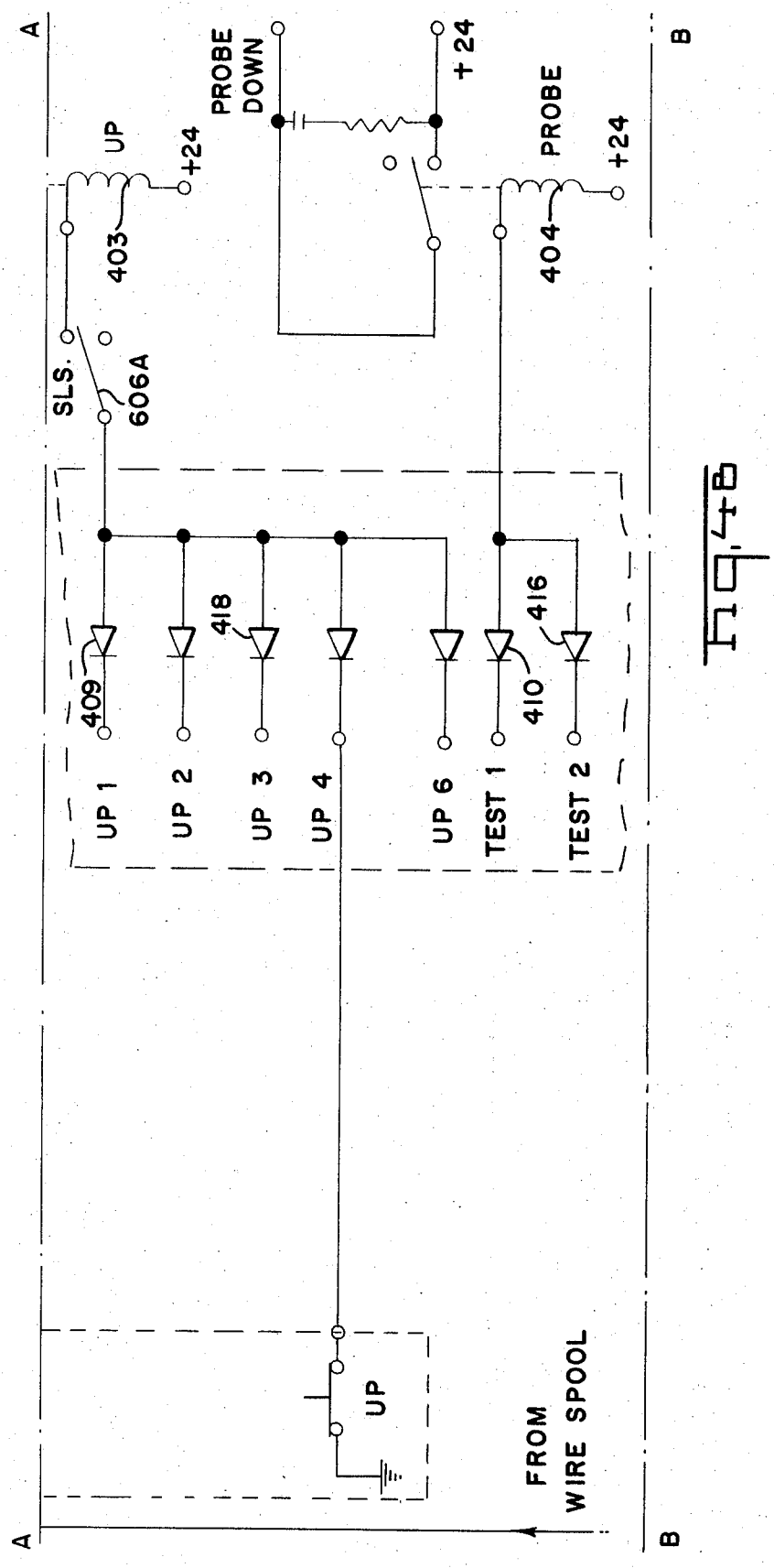
Figure 4C:
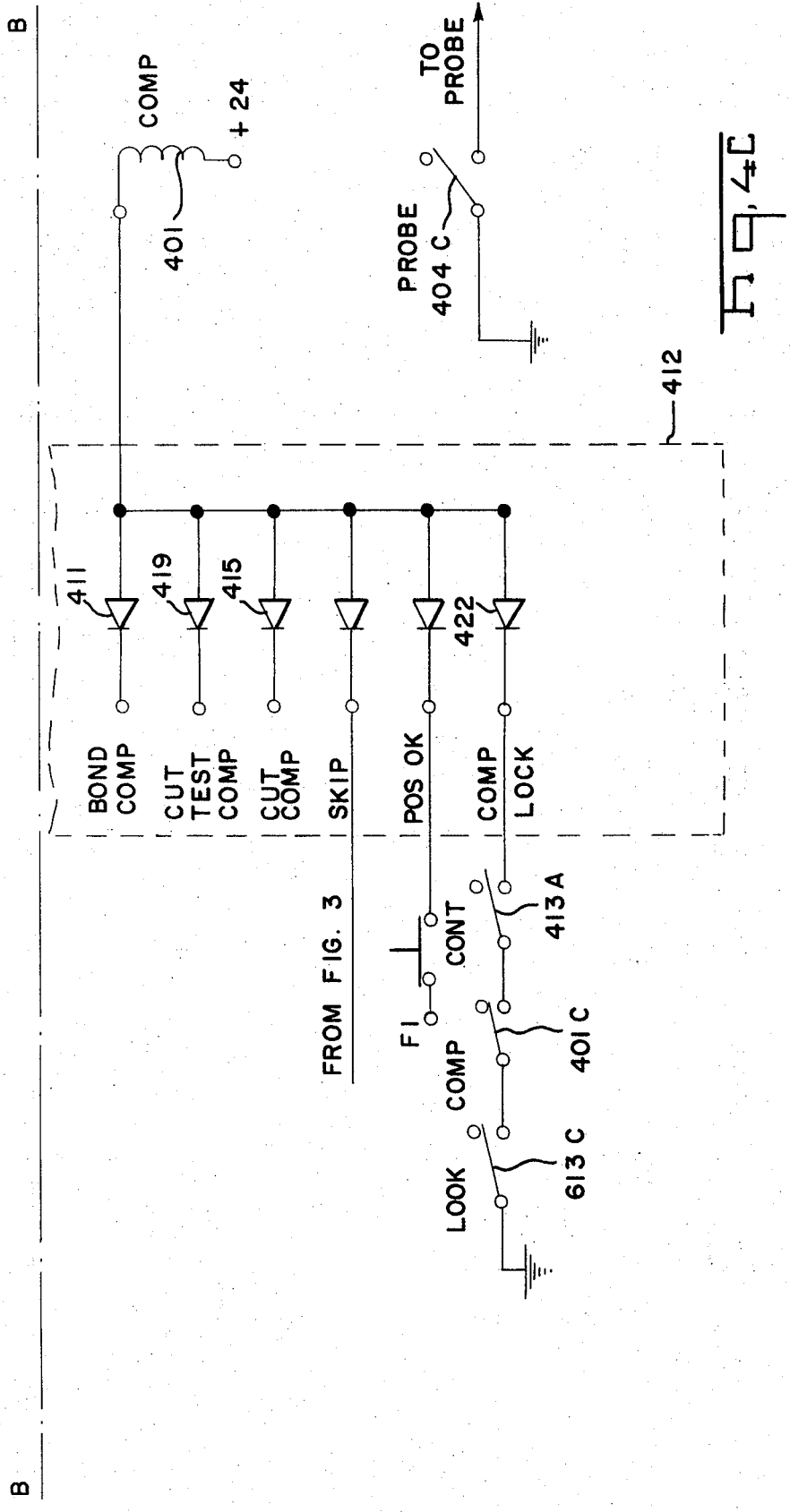
Figure 5:
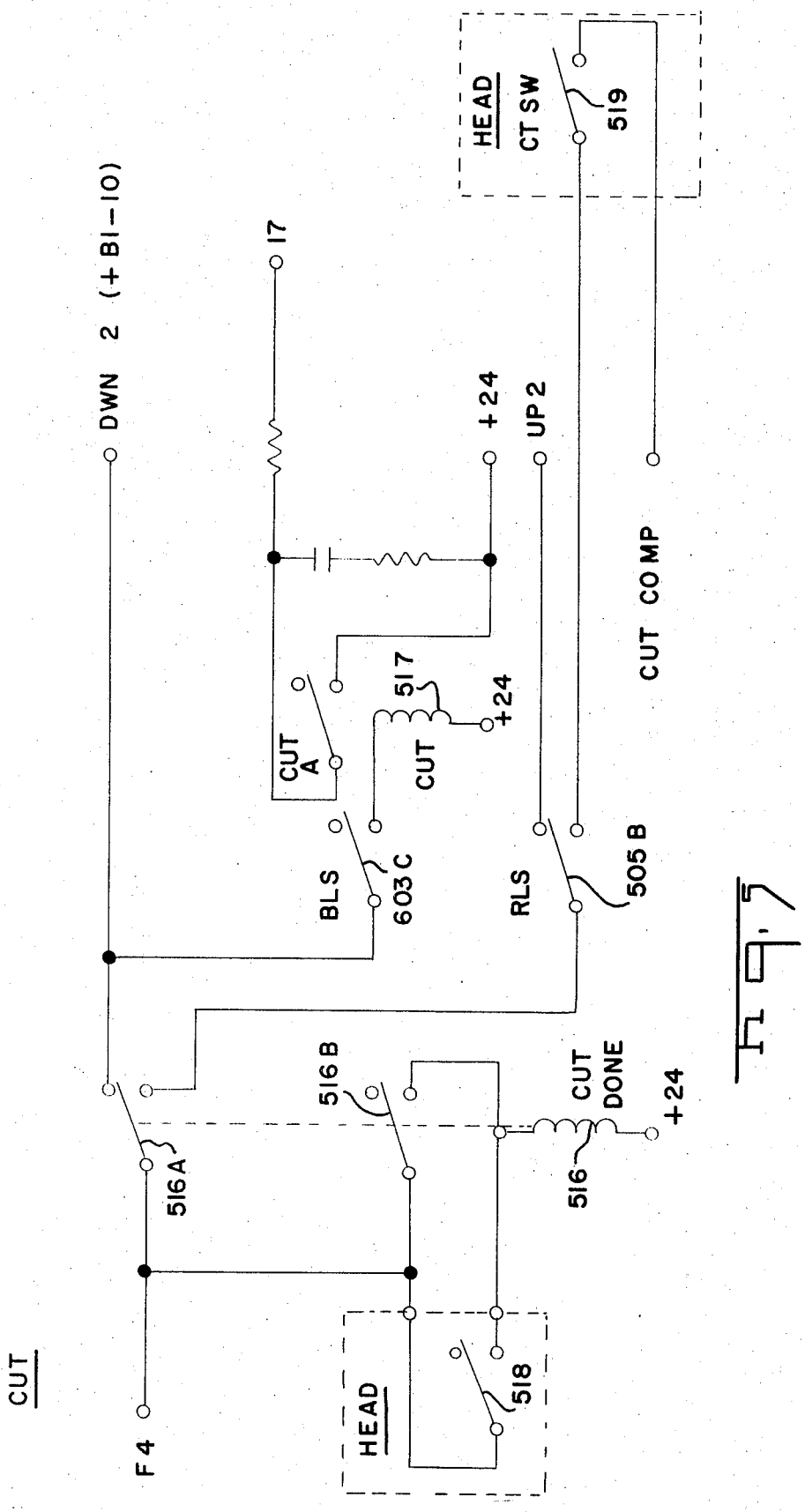
FIG. 5 shows the cut circuit.

Referring to FIG. 1, this invention relates to a system for automatically wiring circuit boards. In such a wiring system a continuous supply of wire from the spool 12 extends through a hole in a solder head 11. An electrical circuit board 13 is mounted on a movable table 14 which effects relative motion between the solder head and the solder pads on the circuit board 13. THe circuit board is automatically positioned beneath the solder head by movement of the table under control of the digital controller 15. For example, the controller 15 may be the commercially available Slo-Syn N/C positioning system manufactured by the Superior Electric Company. This system controls the position of the table 14 from a punched paper tape to automatically position a point on the table beneath a head.

In the particular embodiment being described, four different circuit boards 13, 16, 17 and 18 are concurrently wired by the system. At each point at which a bond is made, certain operations are performed by the solder head and associated apparatus. These operations, or functions, include lowering the solder head onto the pad, heating the solder tip, applying cooling air to the bond, testing the bond for continuity, testing the bond for mechanical strength, testing the wire for short circuits as the heads traverse the board and cutting the wire at the end of a wire network. These functions are under control of the control systems 19–22.

THE MECHANICAL CONSTRUCTION OF THE BONDING HEADS

FIGS. 2A–2B and 2C–2D show a bonding head suitable for use with an automatically operated system. Some features of this head are claimed in the application of James J. Steranko Ser. No. 218,630, filed Jan. 17, 1972, now abandoned which is a division of, Ser. No. 812,022, filed Apr. 1, 1969 now U.S. Pat. No. 3,673,681, issued July 4, 1972. It includes a solder tip 201 having an opening through which a continuous supply of wire (not shown) extends. The tip is mounted on a head assembly which includes bus bars 202 and 203 for supplying current to the solder tip 201.

The entire tip assembly is pivoted on the arbor 204 so that the head can be dropped from its normal rest position into contact with the solder pad on the solder board. This occurs when the stepping motor 205 is energized to step in the down direction. This motor acts through a rotating cam 206 and lever arm 207 to move the head assembly down. When the motor is oppositely energized it moves the head assembly back up to its normal position.

Three switches 208, 209, and 210 sense the three positions of the head assembly. That is, these switches are separately actuated when the head assembly is at the Bonding level, when the head assembly is at the Routing level, and when the head assembly is at the SLEW level. At the Bonding level, the solder tip 201 is in contact with a solder pad on the circuit board. At the Routing level the table is moved in orthogonal directions to string wire from one solder pad to another.

The head assembly moves to the highest, SLEW, level after a net of wires has been completed and the wire is severed. In this position the table moves relative to the head assembly in any direction to get it to the next position at which a wire is to be bonded.

Current is supplied to the bus bars, for heating the soldering tip, through conductors 211 and 212. This current is supplied from a power supply which is controlled by the control system associated with each solder head. Provision is also made for selectively grounding the tip. Upon command from the control unit, ground potential is applied through the bus bars 202 and 203, to the solder tip. This is done when the control system is checking to determine if a short circuit exists between the solder tip and the insulated wire which passes through the tip. If the insulation has been stripped from the wire, electrical continuity is achieved and an alarm condition is signaled. The conductor 213 makes contact with the wire at the non-free end of the wire spool.

Another electrical test is performed by a probe 214 which, upon command from the control system, is moved into contact with the solder pad to which a bond is made. The probe solenoid 215 is energized from the control system to selectively move the probe 214 down. The probe 214 is normally electrically floating. However, during a continuity test, ground potential is applied to the probe through the conductor 216. A switch 217 is actuated when the probe is up and provides an indication to the control system of the "probe up" condition.

Nitrogen gas is continuously supplied through the hole in the bonding tip for cleaning and cooling. This nitrogen is supplied through the manifold 218. A controlled source of air is supplied for cooling the solder pad after the reflow solder bond is made. This air is supplied through an air valve actuated by the solenoid 219. The solenoid 219 is selectively controlled by the control system. The air is supplied through a line 220 to a manifold which is hidden behind the bus bar 202 in FIG. 2A.

In order to cut the wire at the end of a wire net, and electrically operated cutter 221 is provided. The solenoid 222 for the cutter is selectively energized from the control system. A switch 223 is actuated when the cutter is at the top of its stroke, and a similar switch on the other side of the cutter solenoid is actuated when the cutter is at the bottom of the stroke.

A wire lock mechanism is provided to grip the wire and mechanically stress it after a bond has been made. The wire lock 224 and the wire lock solenoid 225 are shown in detail in FIGS. 2E – 2G. The wire lock includes the washers 226 and 227. When the wire lock solenoid 225 is energized, the wire is gripped between two washers and pushed against the spring bias to stress the bond.

DESCRIPTION OF THE CONTROL UNITS

Each of the control systems 19–22 has the circuitry shown in FIGS. 3–8.

In the description of the circuit diagrams of these control systems, a notation has been used which will aid in locating the components on the drawings. The first digit of each reference numeral denotes the drawings on which the component appears. For example, relay 301 appears on FIG. 3. In this description, relay contacts are denoted by the same reference numeral as the relay but are followed by an alphabetic subscript. That is, relay 302 has contacts 302A and 302B. Relay contacts are not always on the same sheet of drawings as the relay. For example, realy 308 appears on FIG. 4 but one set of the contacts actuated by this relay, contacts 408C, appears on FIG. 6.

As an aid to understanding the operations of the relays, each has been given a designation which indicates its function. For example, the relay 408 has been denoted CONT which is a short notation for continuity. This indicates that the relay is energized, or set, when continuity is achieved. All relay contacts have been shown in their unenergized, not set, condition. The circuits are all of the type in which a circuit is completed from ground potential to the relay in order to set the relay.

The functions that are performed during a bonding operation are controlled by three switches on the digital controller 15 in FIG. 1. (The aforementioned Slo-Syn paper tape controller has auxiliary function controls which can be used for this purpose.) The closures of these three switches are decoded to indicate one of seven possible functions which are denoted F1 through F7.

The closures of the switches actuate the three M relays 301–303. The functions selected by these relays can be considered to be weighted in powers of two, with the M relay 301 being the most significant bit. For example, the function F4 is selected by setting, that is energizing, M relay 301 and not setting M relays 302 and 303.

A manual switch 304 is mounted on each solder head unit. It allows the operator to disable a particular solder head without interfering with the operation of the other heads on the same table. The "Skip" position disables all of the F functions and sets the complete (COMP) relay 401.

THE BONDING FUNCTION

Figure 7B:
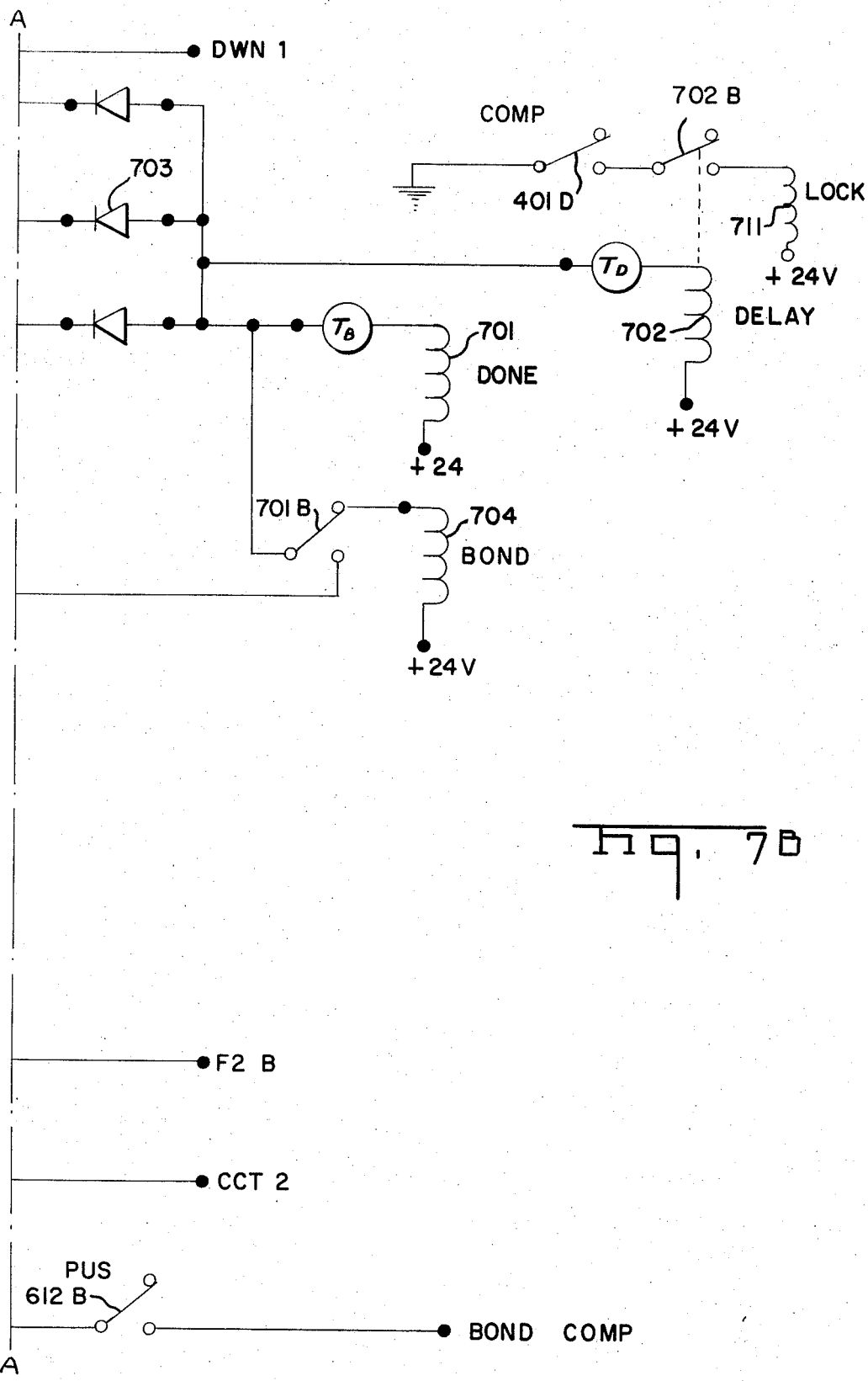

Consider first the bonding function which will be denoted F2. This initiates bond and test operations. This function is selected by energization of the M relay 302. This applies a ground signal through manual switch 304, relay contacts 301A, 302A, and 303B to circuitry which produces the down (DWN 1) signal. Refer to FIG. 7 where the F2 function is applied through the contacts 601B of the STRIP relay, through the contacts 602C of the RECYC relay, and through the contacts 402A of the DONE relay to produce the DWN 1 signal, ground potential. This ground potential DWN 1 signal is applied through diode 405 and through the contacts 603 of the bonding level relay to the DOWN relay 402. The application of ground potential to the top of the DOWN relay 402 causes the bonding head to be lowred to the bonding level. When the bonding head reaches the bonding level a switch 604 is actuated. This energizes the bonding level (BLS) relay 603. This deenergizes the DOWN relay 402 by opening the contacts 603A of the BLS relay.

When the bonding level is reached, as indicated by the setting of the BLS relay 603, ground potential is applied to two time-delay relays on FIG. 7. These are the DONE relay 701 and the DELAY relay 702. The application of ground is from the F2 function, at ground potential, through contacts 602B, switch 710, contacts 602C, through the contacts 603B, and through the diode 703 to the DONE time-delay relay 701, and to the DELAY time-delay relay 702. These two relays remain unactivated until a pre-set delay has elaspsed.

The total heating time of the solder tip is determined by the time-delay setting of the DONE relay 701. This controls the amount of time that the bond relay 704 is energized. When the bond relay 704 is energized, the contacts 704A (FIG. 8B) are closed. This conditions the tip heating power supply 805 to apply a high power to the solder tip. This produces a high heat which sublimates the insulation on the wire.

When the insulation is removed a circuit exists between the spool of wire and the solder tip. The completion of this circuit is detected by the amplifying circuit 406 which applies ground potential through the diode 407 to the continuity (CONT) relay 408. (Another CONT relay 413 is simultaneously energized.) Energization of the CONT relay 408 opens the relay contacts 408D (FIG. 8B) This reduces the power level supplied by the tip heating supply 805 to a level that results in a temperature below insulation sublimation yet above the solder melting temperature. If a circuit is not completed between the wire on the spool and the tip, for example because of a broken wire, the high heat is removed when the delay relay 702 times out. This opens the delay relay contacts 702A (FIG. 8B) to reduce the power supplied to the tip. This prevents possible damage to the circuit board that would result if a high power level was applied for the entire duration of the heating time.

At the end of the tip heating period a ground signal is applied to the OFF time delay relay 706. This relay sets the time that a cooling blast of air is applied to the solder joint. The application of ground potential to the OFF time delay relay 706 is through the contacts 701B of the DONE relay. This ground potential is applied through contacts 706A of the OFF relay to the air control relay (AIR) 707. This closes contacts 707A (FIG. 8A) which applies 110 volts to the air valve 808 which supplies cooling air to the bond. It also operates the bond counter 809. This air blast is applied to the bond during the delay period determined by the OFF relay 706.

When the OFF relay 706 is set, energized, after the time delay, the solder tip is raised. This is accomplished by applying ground potential through contacts 706A and the contacts 605A (FIG. 7) of the routing level (RLS) relay 605. This produces an UP 1 signal, ground potential, which is applied to the diode 409 and through contacts 606A (FIG. 4) of the slew level relay to energize the UP relay 403. The UP relay 403 causes the bonding tip to move in an upward direction until it is deenergized. This relay is energized until the tip reaches the routing level. This is detected by closure of the routing level switch 607. This energizes the RLS relay 605.

During the time the solder head is being raised, the solder joint is mechanically stressed by the wire lock pulling on the wire with a preset force. The wire lock is actuated when the LOCK relay 711 is energized. This occurs when the DELAY relay 702 is set. The LOCK relay 411 remains energized until the COMP relay 401 is set thereby opening contact 401D.

Next, the probe is lowered into contact with the solder pad. The probe relay 404 is set by supplying ground potential through diode 410. This ground potential, referred to as the Test 1 signal, is generated by circuitry on FIG. 6. Note that ground potential exists at the point F2B. This is connected through relay contacts 608A to produce the Test 1 signal.

Energization of the probe relay 404 lowers the probe until it reaches the solder pad. At this point the CONT relay 408 is set if a circuit exists between the probe (in contact with the solder pad) and the wire. As soon as the CONT relay 408 is set, the probe relay 404 is deenergized and the probe returns to the up position. If no continuity is sensed before the delay time set on the test done relay 608 has elapsed, the probe is deactivated and the recycle relay 602 and TWICE relay 609 are set to initiate a second bond sequence.

If the probe finds continuity the CONT relays 408 and 413 are latched up. The CONT 1 relay 408 is latched up by the circuit which is completed through its contacts 408B (FIG. 7), and which applies ground potential through diode 421 to the CONT 1 relay 408.

When the probe is returned to the up position a probe up switch 611 is actuated. This sets the PUS relay 612. The closure of the contacts 612B (FIG. 7)

of the probe up relay completes a circuit which produces a BOND COMP signal, ground potential. Note the various tests which must be met before this signal is produced. The contacts 408B of the CONT relay must be operated indicating a successful continuity check. The contacts 605A of the RLS relay must be operated indicating that the head has returned to the routing level. The contacts 706A of the OFF relay must be actuated indicating that the air has been turned off. There are other tests in this chain. The BOND COMP signal sets the LOOK relay 613. When the LOOK relay 613 is set, ground potential is applied through contacts 613B, 401B (FIG. 6), and diode 622 to the bus bars which extend on either side of the soldering tip. These bars are maintained at ground potential when the head is being routed between solder pads. During this time a continuous test is being made to determine if there is continuity between the head and the wire from the spool.

Note that the solder tip is also grounded during a bonding operation. During this operation the contacts 704C (FIG. 6) are closed. This applies ground through diode 623 to the bus bars on either side of the solder head. When continuity is detected during the bonding operation, the CONT relays 408 and 413 are energized. This actuates the CONTACTS 408 D, FIG. 8B, which switches the power supply 805 from high heat to low heat. That is, when the insulation is completely sublimated, the power supply is automatically switched from the high heat level to the low heat level.

When the BOND COMP signal is produced it acts through diode 4111 to set the COMP relay 401. The actuation of the COMP relay 401 completes a circuit back to the digital controller 15 which allows the controller to move to the next command in the sequence.

Note that there are other conditions which will produce this complete condition. The diode 411 is one of a plurality of diodes in an OR circuit 412 which will signal the paper tape controller 100 that the functions of that particular controller are complete and the operation can proceed. Each of the control systems 19–22 has contacts which are actuated by the COMP relay of that control system. When all of these contacts, connected in series, are actuated, a reset command is produced in the digital controller 100. This removes the F2 signal, i.e., the M relay 302 is deenergized. This causes the DONE relay 701, the DELAY relay 702, the CONT relays 408 and 413, the OFF relay 706 and the COMP relay 401 to be deactivated.

After the COMP relay is reset the bonding tip is grounded by the LOOK relay 613. This relay is energized by the BOND COMP signal, ground potential, applied through diode 614. The bonding tip is grounded through a circuit which extends through contacts 613B and 401B, and through diode 622 to the bus bars extending on either side of the solder tip. If a circuit is formed between the tip and the wire on the spool during subsequent routing operations, a strip relay 601 is energized. The strip relay 601 will remain set until unlatched by the operator. Indication of the strip condition is provided by the strip light 615. The bonding at the end of the routing during which a strip condition occurred cannot proceed until the strip relay 601 is reset by the operator.

When a bond is finished the complete relay 401 and the continuity, CONT relay 413 are set, and the LOOK relay 613 are all set. This locks up the complete COMP relay 401 by a circuit, FIG. 4, which extends through contact 613C, 401C and 413C and diode 422 to set the COMP relay 401.

Other relays are dropped out but the COMP relay is not dropped out until the CONT relays are reset. This ensures that the COMP relay will not be reset before the CONT relay is reset to ensure correct operation of the strip detection circuitry. (FIG. 6)

CUT FUNCTION

The cut function is performed after a network of wires have been soldered. The wire is cut at the end of the net. The function is programmed by the digital controller 15 setting the relay 301. This applies ground potential to a conductor producing the F4 function. This is applied through contacts 516A to produce the DWN 2 signal which acts through diode 414 to set the DOWN relay 402. This lowers the head into contact with the board to hold the wire in position for the cutter.

When the solder head reaches the board, indicated by closure of the switch 604 and setting of the BLS relay 603, the CUT relay 517 is set. This causes the cutter to travel toward the circuit board to cut the wire which is beneath its path of travel.

When the cutter reaches the bottom of its travel, the switch 518 is closed. This sets the CUT DONE relay 516. The setting of the CUT DONE relay deenergizes the cutter solenoid by operating the contacts 516A which remove ground potential from the CUT relay 517. This allows the cutter to return to its rest position. It also supplies ground potential through contacts 505B to produce an UP 2 signal. This is applied to the UP relay 403 to raise the solder head to the routing level.

When the CUT DONE relay 516 is set, the solder head is at the routing level, and the cutter is at its top position as indicated by closure of the CTSW switch 619, a CUT COMPLETE signal is produced. This signal is applied through diode 415 to set the complete relay 401. This signals the digital controller that the function has been performed, the auxiliary, external, switches in the digital controller 15 are reset and the controller moves to the next command.

CUT TEST FUNCTION

After a cut has been performed, the solder tip is repositioned over the last pad in the net to verify that no circuit exists between the wire on the spool and the pad. A determination is made as to whether the cut was successful.

This function is programmed in the digital controller by setting auxiliary switches which set the M relays 301 and 302. This produces the F6 signal, ground potential. The F6 signal is connected through contacts 408C (FIG. 6) and 608B to produce the TEST 2 signal. This acts through diode 416 to set the probe relay 404 which lowers the probe into contact with the solder pad. The existence of a circuit between the probe and the wire on the spool is determined by the sensing circuit 406. If no such circuit exists, the probe is raised when the TEST DONE relay 608 times out. This removes ground potential and terminates the TEST 2 signal.

Operation of the TEST DONE relay contacts 608B produces an UP 3 signal which acts through diode 417 to raise the solder head to the SLEW level which is the highest level.

When the probe has reached its UP position, indicated by the setting of PUS relay 612, and the solder head is at the SLEW level, indicated by closure of the switch 620 and the setting of the SLS relay 606, a CUT TEST COMP signal is produced. Note that switch contacts 608B, 612A and 606B are all operated to apply ground potential which produces this signal. The CUT TEST COMP signal is applied through diode 419 to set the complete relay 401 which signals the digital controller that the function has been completed.

If continuity is detected between the probe and the wire on the spool before the TEST DONE relay 608 has timed out, the CONT 1 relay 408 is set and latched. Latching takes place by reason of ground potential being applied through the operated contacts 408C (FIG. 6), through the manual pushbutton 621 and through the diode 420 to latch the CONT 1 relay 408. It will remain latched until the pushbotton 621 is depressed.

RECYCLE AND REBOUND

If a proper bond is not made the first time the solder head is lowered into contact with the pad, this will be detected by the continuity check. Then the solder head will be recycled to attempt another bonding operation. During the bonding cycle the actuation of contacts 605A (FIG. 7) of the routing level relay produced the F2B signal, ground potential. This signal was used to produce the TEST 1 signal which lowered the probe. If continuity was achieved, the F2B signal is removed because contacts 408B (FIG. 7) are actuated.

However, if continuity is not obtained the probe stays down on the pad for a time determined by the time delay period of relay 608. The timing out of this relay is started by application of the F2B signal through diode 624 to the relay 608. After approximately 150 milliseconds the TEST DONE relay 608 times out and the probe returns to its UP position.

The recycle relay 602 is latched up. TWICE relay 609 is set. With the RECYC and TWICE relays set the two contacts 602C and 604C break the path of the F2 signal to the Bond function relays. This causes the DONE, DELAY, OFF TEST DONE AND CONT relays to drop out. The dropping out of the OFF relay causes the RECYC relay to be unlatched which in turn restores the F2 function to the Bond logic through contact 602C. The TWICE relay 609 is the memory which records that this is the second bonding cycle. The bonding cycle will not be repeated. If continuity is not produced during the continuity test, the bond light 610 is energized. It will stay energized until the rebond pushbutton 710 is depressed. This removes the F2 signal.

Note that on the second cycle of the bonding operation the contacts 609D (FIGS. 8B) of the TWICE relay are open because that relay is set. This sets the tip heating power supply 805 to supply a low heat to the solder tip during the second bonding operation. This prevents possible damage to the circuit board by applicaton of too much heat.

Note that the circuitry provides for a position check. After an arbitrary number of networks have been wired the digital controller is programmed to supply a position check. This is programmed by energizing the relay 303 which produces an F1 signal. This positions the head to a HOME postion on the circuit board and energizes a POSITION CHECK light. If the head is correctly positioned, the operator depresses a button on the operator's console to generate the POSITION OKAY signal.

The operation of the system of this invention can be better understood from a comparison of FIGS. 9 and 10. FIGS. 9A through 9O show timing diagrams for the various functions performed during the making of a good bond on the first cycle of operation. FIGS. 10A through 10S show timing diagrams depicting the operation when a bad bond is made during the first cycle and a good bond is made during the second bonding cycle.

While particular embodiments of the invention have been shown and described, various modifications may be made without departing from the true spirit and scope of the invention. The appended claims are, therefore, intended to cover any such modifications.

What is claimed is:

1. Apparatus for automatically wiring circuit boards in a point-to-point wiring operation comprising:
   a plurality of solder heads in which heat is concentrated in the tip thereof and having an opening in said tip through which a supply of insulated wire extends,
   a table adapted for mounting circuit boards, one circuit board beneath each of said heads, said table and said heads being movable one with respect to the other so that said heads can be aligned with pads on said circuit boards to which said wire is to be soldered,
   a digital controller for positioning said table with respect to said heads to align said heads with a pad to which wire is to be soldered, said digital controller operating under control of a stored program, and
   a control system for each head, said control system being responsive to signals from said digital controller for automatically operating said head in operation of lowering said head into contact with a pad, selectively applying heat to the pad to reflow solder the portion of the wire in contact with the pad, and for raising said head.

2. The apparatus recited in claim 1 wherein each of said control systems further comprises means for automatically initiating the flow of cooling air to the solder pad after the reflow soldering of the wire to the pad.

3. The apparatus recited in claim 1 further comprising a probe and wherein each of said control systems further comprises:
   means for moving said probe into contact with the resulting bond, and
   means for checking electrical continuity between said wire and said probe to determine that an electrical connection has been made.

4. The apparatus recited in claim 3 wherein each of said control systems further comprises means for initiating a new bonding cycle when a determination has been made that no electrical connection exists between said wire and said probe.

5. The apparatus recited in claim 1 further comprising a wire gripper for each solder head and wherein each control system further comprises:
   means for activating said wire gripper after a bond has been made, said wire gripper applying mechanical stress to said bond to determine that a mechanically strong bond has been made.

6. The apparatus recited in claim 1 wherein each of said control systems comprises:
   means operable when said head and said table are movable one with respect to the other for sensing electrical continuity between said wire and said head.

7. Apparatus for automatically wiring circuit boards in a point-to-point wiring operation comprising:
   a bonding head having an opening through which a continuous supply of insulated wire extends,
   a table, said circuit board being mounted on said table, said table and said head being movable with respect to the other so that said head can be aligned with a point on said circuit board to which said wire is to be bonded,
   means producing relative movement between said head and said board so that said head contacts the point on said board to which said wire is to be bonded,
   a probe,
   means for moving said probe into contact with the resulting bond,
   means for checking electrical continuity between said wire and said probe to determine that an electrical connection has been made,
   means operable when said head and said table are movable one with respect to the other for sensing electrical continuity between said wire and said tip, and
   an indicator actuated when said continuity exists to indicate that the insulation on said wire is stripped.

8. The apparatus recited in claim 7 further comprising:
   a wire gripper,
   means for activating said wire gripper after a bond has been made, said wire gripper applying mechanical stress to said bond to determine that a mechanically strong bond has been made.

9. Apparatus for automatically wiring circuit boards in a point-to-point wiring operation comprising:
   a plurality of solder heads in which heat is concentrated in the tip thereof and having an opening in said tip through which a supply of insulated wire extends,
   a table adapted for mounting circuit boards, one circuit board beneath each of said heads, said table and said heads being movable one with respect to the other so that said heads can be aligned with pads on said circuit boards to which said wire is to be soldered,
   a digital controller for positioning said table with respect to said heads to align said heads with a pad to which wire is to be soldered, said digital controller operating under control of a stored program,
   a control system for each head, said control system being responsive to signals from said digital controller for automatically operating said head in operation of lowering said head into contact with a pad, selectively applying heat to the pad to reflow solder the portion of the wire in contact with the pad, and for raising said head,
   a probe for each of said control systems,
   means for moving said probe into contact with the resulting bond,
   means for checking electrical continuity between said wire and said probe to determine that an electrical connection has been made,
   means in each said control systems for initiating a new bonding cycle when a determination has been made that no electrical connection exists between said wire and said probe, and
   means for supplying a lower heat to the solder tip during said new bonding cycle than in a normal bonding cycle whereby possible damage to the circuit board by application of too much heat is avoided.

* * * * *

PO-1050
(5/69)

UNITED STATES PATENT OFFICE
CERTIFICATE OF CORRECTION

Patent No. 3,840,169    Dated October 8, 1974

Inventor(s) JAMES J. STERANKO and JOHN HENRY HOLLAND

It is certified that error appears in the above-identified patent and that said Letters Patent are hereby corrected as shown below:

Column 2, line 61, "THe" should read --the--.

Column 4, line 22, "and" should read --an--.

Column 5, line 45, "602B" should read --601B--.

Column 6, line 41, "411" should read --711--.

Column 7, line 32, "4111" should read --411--.

Column 9, line 20, "RECYCLE AND REBOUND" should read --RECYCLE AND REBOND--.

Column 9, line 55, "(FIGS. 8B)" should read --(FIG. 8B)--.

Signed and sealed this 3rd day of December 1974.

(SEAL)
Attest:

McCOY M. GIBSON JR.
Attesting Officer

C. MARSHALL DANN
Commissioner of Patents